United States Patent [19]
Federico et al.

[11] Patent Number: 4,532,584
[45] Date of Patent: Jul. 30, 1985

[54] RACE CONTROL SUSPENSION

[75] Inventors: Anthony M. Federico, West Webster; Ronald A. Ippolito, Rochester; Ernest L. Legg, Fairport, all of N.Y.

[73] Assignee: Xerox Corporation, Stamford, Conn.

[21] Appl. No.: 421,010

[22] Filed: Sep. 21, 1982

[51] Int. Cl.³ ............................................. G05B 15/02
[52] U.S. Cl. ................................. 364/140; 355/14 C
[58] Field of Search ............... 364/140, 141, 142, 143; 355/14 C, 14 R

[56] References Cited

U.S. PATENT DOCUMENTS

| | | | |
|---|---|---|---|
| 3,614,742 | 10/1971 | Watson et al. | 340/172.5 |
| 3,699,529 | 10/1972 | Beyers et al. | 340/172.5 |
| 3,760,365 | 9/1973 | Kurtzberg et al. | 340/172.5 |
| 3,787,816 | 1/1974 | Hauck et al. | 340/172.5 |
| 3,805,247 | 4/1974 | Zucker et al. | 340/172.5 |
| 3,812,469 | 5/1974 | Hauck et al. | 340/172.5 |
| 3,916,383 | 10/1975 | Malcolm | 340/172.5 |
| 3,978,452 | 8/1976 | Barton et al. | 340/172.5 |
| 3,983,539 | 9/1976 | Faber et al. | 340/172.5 |
| 3,983,541 | 9/1976 | Faber et al. | 340/172.5 |
| 4,044,334 | 8/1977 | Bachman et al. | 364/200 |
| 4,064,395 | 12/1977 | Schubeler et al. | 364/107 |
| 4,084,228 | 4/1978 | Dufond et al. | 364/200 |
| 4,099,252 | 7/1978 | Danco | 364/900 |
| 4,123,794 | 10/1978 | Matsumoto | 364/101 |
| 4,138,718 | 2/1979 | Toke et al. | 364/200 |
| 4,156,133 | 5/1979 | Legg | 355/14 C |
| 4,162,396 | 7/1979 | Howard et al. | 355/14 C |
| 4,170,791 | 10/1979 | Daughton et al. | 364/900 |
| 4,186,299 | 1/1980 | Batchelor | 235/304.1 |
| 4,215,395 | 7/1980 | Bunyard et al. | 364/101 |
| 4,215,398 | 7/1980 | Burkett et al. | 364/101 |
| 4,219,873 | 8/1980 | Kober et al. | 364/200 |
| 4,224,664 | 9/1980 | Trinchieri | 364/200 |
| 4,228,495 | 10/1980 | Bernhard et al. | 364/101 |
| 4,229,790 | 10/1980 | Gilliland et al. | 364/200 |
| 4,253,145 | 2/1981 | Goldberg | 364/200 |
| 4,304,001 | 12/1981 | Cope | 371/8 |
| 4,322,847 | 3/1982 | Dodge et al. | 371/20 |
| 4,327,993 | 5/1982 | Gauronski et al. | 355/14 SH |
| 4,343,036 | 8/1982 | Shimizu et al. | 364/518 |

Primary Examiner—Jerry Smith
Assistant Examiner—Louis Woo
Attorney, Agent, or Firm—Ronald F. Chapuran

[57] ABSTRACT

The present invention is a means to race two or more conditions against each other to trigger a unique control response. In particular, a portion of a machine control is suspended upon the occurrence of conditions such as an input, a time delay, availability of data, or completion of a task. These conditions race against one another. That is, the occurrence of one of the conditions will initiate the response, and all other conditions will then be ignored. The type of response depends upon the particular condition that occurred first.

9 Claims, 8 Drawing Figures

FIG. 5a

| | 0 | 1 | 2 | 3 | 4 | 5 | 6 | 7 | 8 | 9 | A |
|---|---|---|---|---|---|---|---|---|---|---|---|
| | COMMUNICATION | REC. BUF. CONT'D. | DBM BYTE STACK | | STCB RTID | CTID | NEXT INST | PARENT RTID | JOIN RTID | ACTIVE ADDER | |
| | | | LINK | DATA | | | | | | MS | LS |
| | | TRANS VARS | | | | | | | | | |
| RCCBS | | | | | 1 | 1 | | | | | |
| | | | | | 2 | 2 | | | TCM | | |
| | | TRANS UNITS AND CCBS | | | 3 | 3 | EVENT MAP | | | | |
| | | | | | . | . | LINK | DATA | | | |
| | | | | | . | . | | | | R.T.C. | |
| | | | | | . | 96 | | | | | |
| | | | | | . | | | | | TIMER DELTA | FRWD LINK |
| REC BUFFERS | | DBM | BYTE SP | WORD SP | 255 | | EVENT | | | | |
| | | | | | | | LINK | MASK | SENSE | RTID | |
| | | POINTER TO BYTE AND WORD STACKS | | | | | | | | | |
| | AK CCBS | | | | | | | | | | |
| | REC VARS | | | | | | | | | | |
| | LOAD VARS | | | | | | | | | | |

FIG.5b

| B | C | D | E | F | | | | | | |
|---|---|---|---|---|---|---|---|---|---|---|
| | | SCHEDULER | | | | | | | | |
| | INTP ADDR TABLE | PRIORITY | FRWD LINK | BKWD LINK | | | | | | |
| COND VAR | | | | | | | | | | |
| | | | | | | | | | | |
| | | | | | | | | | | |
| | MC | | | | DBM | | | | | |
| TIMER DELTA | FRWD LINK | | | | | WORD STACK | | | USER RAM | |
| | | | | | | LINK | DATA | | | |
| | | | | | | | MS | LS | | |
| | | | | | | | | | | |

FIG. 6

| CPM (1) | | RDH (2) | |
|---|---|---|---|
| CTID 35 | TASK-A (XXXX) | CTID 55 | TASK-B (XXXX) |
| CTID 55 | TASK-B (0002) | CTID 35 | TASK-A (0001) |

ROM
TASK-A

A⤻

CALL TASK-B (10)

END

ROM
TASK-B

END

RAM
TCB

| RTID | CTID | P-ID | J-ID | ACT ADDR. |
|---|---|---|---|---|
| 1 | 55 | 2 | 0 | 0002 |
| 2 | 35 | — | 00 | XXXX |

RAM
TCB

| RTID | CTID | P-ID | J-ID | ACT ADDR. |
|---|---|---|---|---|
| 1 | 16 | | | |
| 2 | 15 | | | |
| 3 | 35 | — | 4 | 0001 |
| 4 | 55 | 3 | 00 | XXXX |

RACE CONTROL SUSPENSION

This invention relates to an electronic control and, in particular, to a means to suspend control and race interrupt conditions.

For further information relating to this application, reference is made to the following companion U.S. patent applications filed concurrently herewith to the common assignee U.S. Ser. No. 420,965, Remote Process Crash Recovery; U.S. Ser. No. 420,988, Process Scheduler in an Electronic Control; U.S. Ser. No. 420,991, Distributed Processing Environment Fault Isolation; U.S. Ser. No. 420,992, Common Control in Multiple Processors By Chaining Tasks; U.S. Ser. No. 420,993, Virtual Machine Control; U.S. Ser. No. 420,994, Task Control Manager; U.S. Ser. No. 420,995, Control System Job Recovery After a Malfunction; U.S. Ser. No. 420,999, Separate Resetting of Processors in a Multiprocessor Control; U.S. Ser. No. 421,006, Filtered Inputs; U.S. Ser. No. 421,007, Multiprocessor Control Synchronization and Instruction Downloading; U.S. Ser. No. 421,008, Multiprocessor Memory Map; U.S. Ser. No. 421,009, Changing Portions of Control in a ROM Based System; U.S. Ser. No. 421,011, Control Fault Detection for Machine Recovery and Diagnostics Prior to Malfunction; U.S. Ser. No. 421,016, Single Point Microprocessor Reset; and U.S. Ser. No. 421,615, Control Crash Diagnostics.

In complex electronic control systems, the control must respond to various occurrences such as input conditions (a change of state of a switch), lapsed time periods, or completion of specific tasks. This is often referred to as event detection and descrimination, and sometimes the events are common and sometimes of a rare or unique nature. Frequently, the next control sequence is a control procedure responsive to more than one event or condition. It is often necessary for the control to wait for the occurrence of each event upon which the next action was dependent.

It is known in the prior art to be able to suspend the control to wait either on time or an input change to continue operation. In some situations, the control is waiting for a plurality of events or conditions but it is only necessary for the occurrence of one of the events or conditions to trigger the appropriate response. Waiting for unnecessary conditions can be wasteful of control time. On the other hand, the timing of conditions or suspensions in a control is often an important failsafe technique.

It would be desirable, therefore, to provide a control mechanism wherein the control is responsive to any one of a plurality of conditions or events. It would also be desirable to provide a control that can execute on a plurality of events but actually executes upon sensing the first occurrence of the events ignoring the remaining events.

It is an object of the present invention, therefore, to provide a new and improved control and, in particular a control in which two or more conditions race against each other to trigger a response.

Further advantages of the present invention will become apparent as the following description proceeds, and the features characterizing the invention will be pointed out with particularity in the claims annexed to and forming a part of this specification.

Briefly, the present invention is a means to race two or more conditions against each other to trigger a control response. In particular, a portion of a machine control is suspended upon the occurrence of conditions such as an input, a time delay, availability of data, or completion of a task. These conditions race against one another. That is, the occurrence of one of the conditions will initiate the response, and all other conditions will then be ignored. The type of response depends upon the particular condition that occurred first.

For a better understanding of the present invention reference may be had to the accompanying drawings wherein the same reference numerals have been applied to like parts and wherein:

FIGS. 5a and 5b illustrate a RAM map in accordance with the present invention;

FIG. 6 illustrates one aspect of the operation of the Task Manager according to the present invention.

Figure 1:
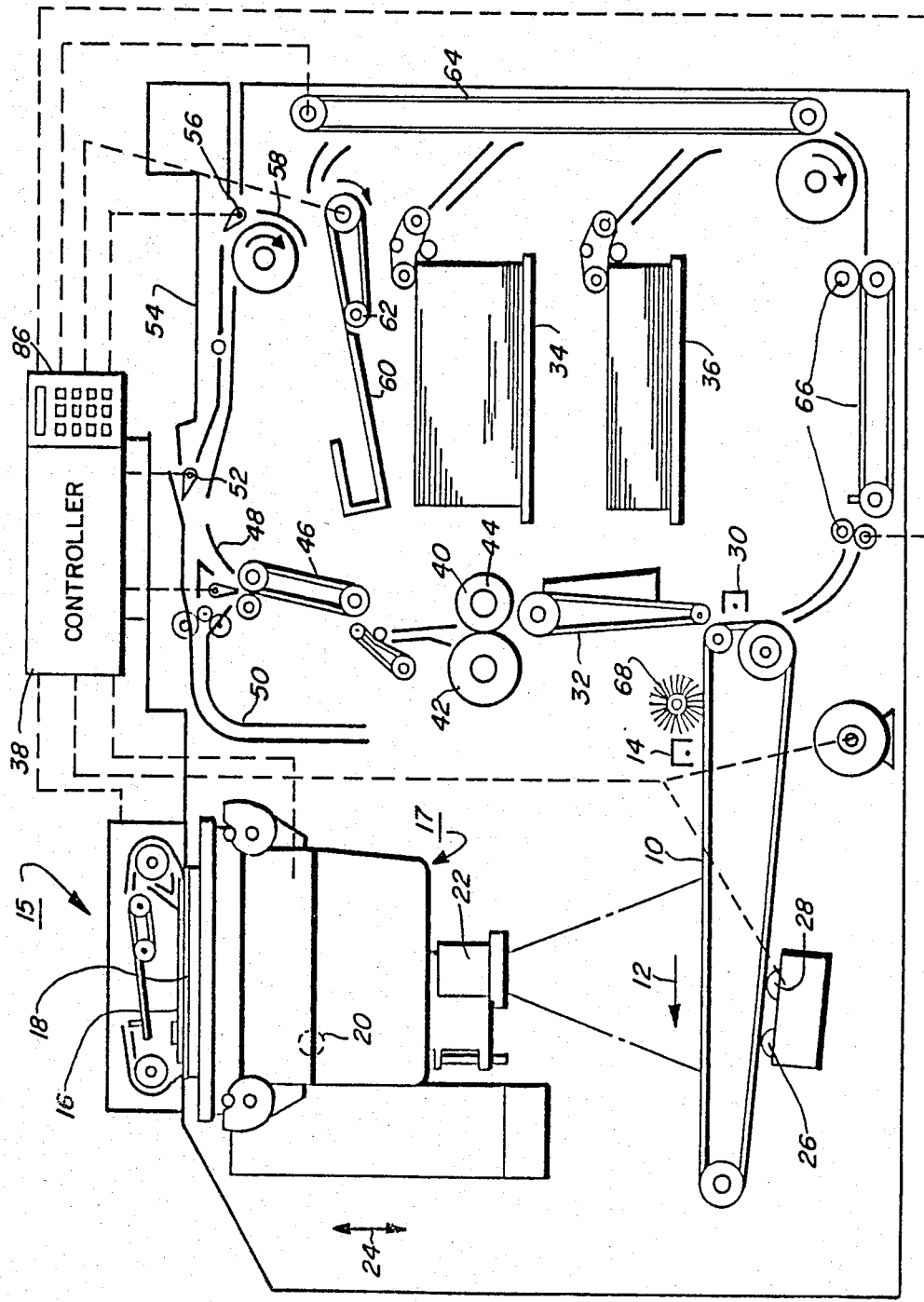
FIG. 1 is an elevational view of a reproduction machine typical of the type of machine or process that can be controlled in accordance with the present invention.

With reference to FIG. 1, there is shown an electrophotographic printing or reproduction machine employing a belt 10 having a photoconductive surface. Belt 10 moves in the direction of arrow 12 to advance successive portions of the photoconductive surface through various processing stations, starting with a charging station including a corona generating device 14. The corona generating device charges the photoconductive surface to a relatively high substantially uniform potential.

The charged portion of the photoconductive surface is then advanced through an imaging station. At the imaging station, a document handling unit 15 positions an original document 16 facedown over exposure system 17. The exposure system 17 includes lamp 20 illuminating the document 16 positioned on transparent plate 18. The light rays reflected from document 16 are transmitted through lens 22. Lens 22 focuses the light image of original document 16 onto the charged portion of the photoconductive surface of belt 10 to selectively dissipate the charge. This records an electrostatic latent image on the photoconductive surface corresponding to the informational areas contained within the original document.

Platen 18 is mounted movably and arranged to move in the direction of arrows 24 to adjust the magnification of the original document being reproduced. Lens 22 moves in synchronism therewith so as to focus the light image of original document 16 onto the charged portion of the photoconductive surface of belt 10.

Document handling unit 15 sequentially feeds documents from a holding tray, in seriatim, to platen 18. The document handling unit recirculates documents back to the stack supported on the tray. Thereafter, belt 10 advances the electrostatic latent image recorded on the photoconductive surface to a development station.

At the development station a pair of magnetic brush developer rollers 26 and 28 advance a developer material into contact with the electrostatic latent image. The latent image attracts toner particles from the carrier granules of the developer material to form a toner powder image on the photoconductive surface of belt 10.

After the electrostatic latent image recorded on the photoconductive surface of belt 10 is developed, belt 10 advances the toner powder image to the transfer station. At the transfer station a copy sheet is moved into contact with the toner powder image. The transfer station includes a corona generating device 30 which sprays ions onto the backside of the copy sheet. This attracts the toner powder image from the photoconductive surface of belt 10 to the sheet.

The copy sheets are fed from a selected one of trays 34 or 36 to the transfer station. After transfer, conveyor 32 advances the sheet to a fusing station. The fusing station includes a fuser assembly for permanently affixing the transferred powder image to the copy sheet. Preferably, fuser assembly 40 includes a heated fuser roller 42 and backup roller 44 with the sheet passing between fuser roller 42 and backup roller 44 with the powder image contacting fuser roller 42.

After fusing, conveyor 46 transports the sheets to gate 48 which functions as an inverter selector. Depending upon the position of gate 48, the copy sheets will either be deflected into a sheet inverter 50 or bypass sheet inverter 50 and be fed directly onto a second gate 52. Decision gate 52 deflects the sheet directly into an output tray 54 or deflects the sheet into a transport path which carries them on without inversion to a third gate 56. Gate 56 either passes the sheets directly on without inversion into the output path of the copier, or deflects the sheets into a duplex inverter roll transport 58. Inverting transport 58 inverts and stacks the sheets to be duplexed in a duplex tray 60. Duplex tray 60 provides intermediate or buffer storage for those sheets which have been printed on one side for printing on the opposite side.

In order to complete duplex copying, the previously simplexed sheets in tray 60 are fed seriatim by bottom feeder 62 back to the transfer station for transfer of the toner powder image to the opposed side of the sheet. Conveyors 64 and 66 advance the sheet along a path which produces a sheet inversion. The duplex sheets are then fed through the same path as the previously simplexed sheets to be stacked in tray 54 for subsequent removal by the printing machine operator.

Invariably after the copy sheet is separated from the photoconductive surface of belt 10, some residual particles remain adhering to belt 10. These residual particles are removed from the photoconductive surface thereof at a cleaning station. The cleaning station includes a rotatably mounted fibrous brush 68 in contact with the photoconductive surface of belt 10.

A controller 38 and control panel 86 are also illustrated in FIG. 1. The controller 38, as represented by dotted lines, is electrically connected to the various components of the printing machine.

Figure 2:
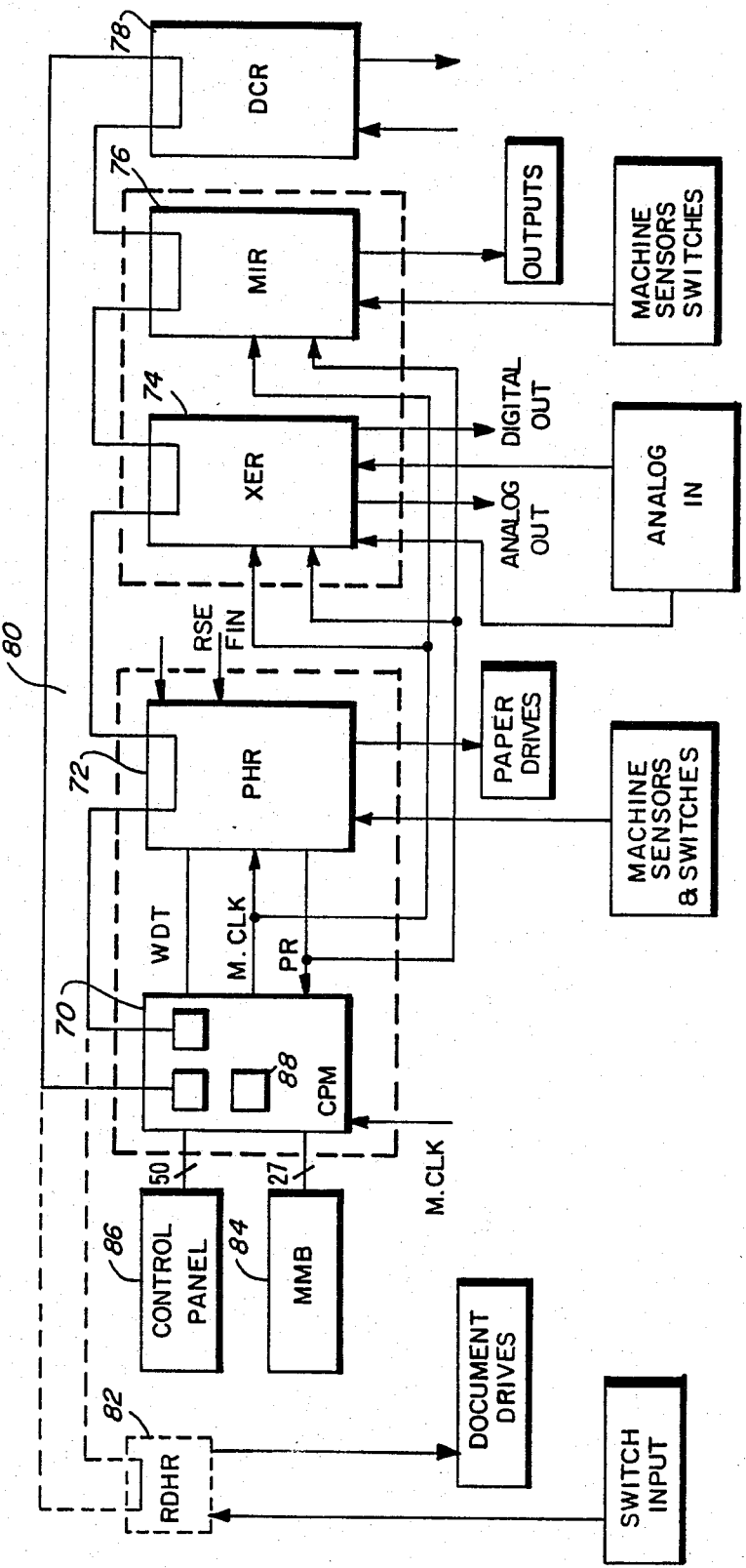
FIG. 2 is a block diagram of a first level of control architecture for controlling the machine of FIG. 1.

With reference to FIG. 2, there is shown a first level of control architecture of controller 38 illustrated in FIG. 1. In accordance with the present invention, in particular, there is shown a Central Processing Master (CPM) control board 70 for communicating information to and from all the other control boards, in particular the Paper Handling Remote (PHR) control board 72 controlling the operation of all the paper handling subsystems such as paper feed, registration and output transports.

Other control boards are the Xerographic Remote (XER) control board 74 for monitoring and controlling the xerographic process, in particular the digital signals; the Marking and Imaging Remote (MIR) control board 76 for controlling the operation of the optics and xerographic subsystems, in particular the analog signals. A Display Control Remote (DCR) control board 78 is also connected to the CPM control board 70 providing operation and diagnostic information on both an alphanumeric and liquid crystal display. Interconnecting the control boards is a shared communication line 80, preferably a shielded coaxial cable or twisted pair similar to that used in a Xerox Ethernet ® Communication System. For a more detailed explanation of an Ethernet ® Communication System, reference is made to pending applications D/78108, U.S. Ser. No. 205,809; D/78108Q2, U.S. Ser. No. 205,822 and D/78108Q3, U.S. Ser. No. 205,821, all filed Nov. 10, 1980 and incorporated herein as references.

Other control boards can be interconnected to the shared communication line 80 as required. For example, a Recirculating Document Handling Remote (RDHR) control board 82 (shown in phantom) can be provided to control the operation of a recirculating document handler. There can also be provided a not shown Semi-Automatic Document Handler Remote (SADHR) control board to control the operation of a semi-automatic document handler, a not shown Sorter Output Remote (SOR) control board to control the operation of a sorter, and a not shown finisher output remote (FOR) control board to control the operation of a stacker and stitcher.

Each of the controller boards preferably includes an Intel 8085 microprocessor with suitable RAM and ROM memories. Also interconnected to the CPM control board is a Master Memory Board (MMB) 84 with suitable ROMs to control normal machine operation and a control panel board 86 for entering job selections and diagnostic programs. Also contained in the CPM board 70 is suitable nonvolatile memory. All the control boards other than the CPM control board are generally referred to as remote control boards.

In a preferred embodiment, the control panel board 86 is directly connected to the CPM control board 70 over a 70 line wire and the memory board 84 is connected to the CPM control board 70 over a 36 line wire. Preferably, the Master Memory Board 84 contains 56K byte memory and the CPM control board 70 includes 2K ROM, 6K RAM, and a 512 byte nonvolatile memory. The PHR control board 72 includes 1K RAM and 4K ROM and preferably handles 29 inputs and 28 outputs. The XER control board 74 handles 24 analog inputs and provides 12 analog output signals and 5 digital output signals and includes 4K ROM and 1K RAM. The MIR board 76 handles 13 inputs and 17 outputs and has 4K ROM and 1K RAM.

As illustrated, the PHR, XER and MIR boards receive various switch and sensor information from the printing machine and provide various drive and activation signals, such as to clutches and lamps in the operation of the printing machine. It should be understood that the control of various types of machines and processes are contemplated within the scope of this invention.

Figure 3:
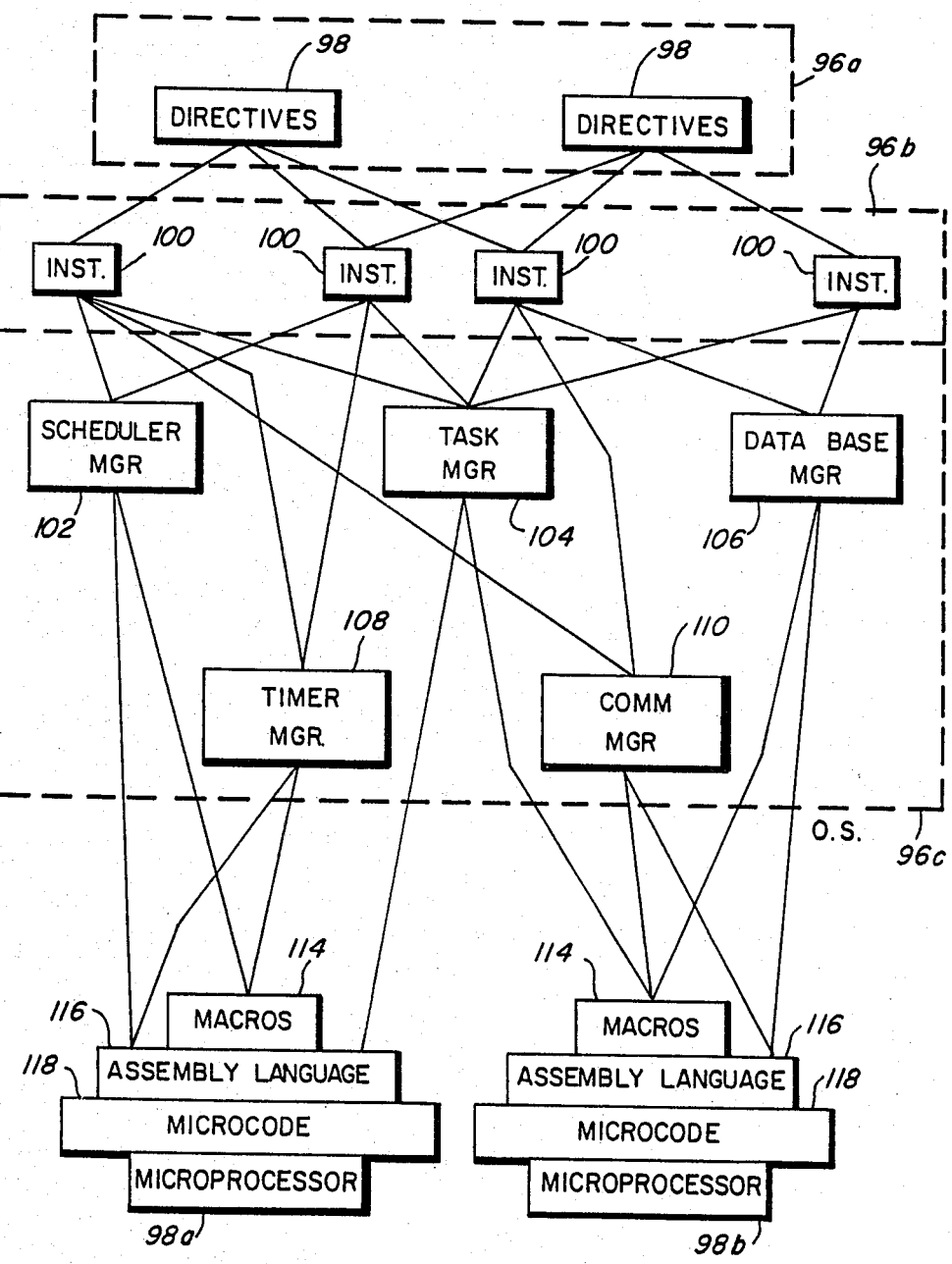
FIG. 3 illustrates a second level of control architecture, in particular a virtual machine in accordance with the present invention, for controlling the machine of FIG. 1.

In accordance with the present invention, with reference to FIG. 3, there is shown a second level of control architecture, an Operating System (O.S.). The Operating System is shown by the dotted line blocks indicated by the numerals 96a, 96b and 96c. The Operating System is shown in communication with the macros and assembly language instructions of a pair of microprocessors 98a and 98b. The Operating System could communicate with any number of microprocessors, for example, the microprocessors of each of the control boards 70, 72, 74, 76, 78 and 82 shown in FIG. 2. The Operating System overlies the control architecture of FIG. 2 and, in general, acts as a manager of the various resources such as the CPM and remote board microprocessors and the ROM and RAM memories of each of the control boards. In accordance with the present invention, the Operating System converts the raw microprocessor hardware into a virtual machine in controlling the printing machine shown in FIG. 1. By virtual machine is meant that portion of the control illustrated by numerals 96a, 96b and 96c that surround the system hardware. In effect, the Operating System presents a control more powerful then the underlying hardware itself.

With reference to FIG. 3, the Operating System is presented with a plurality of Directives 98. These Directives call upon one or more decoders or Instruction Modules 100. In turn, the Instruction Modules 100 invoke one or more Primitives. In particular, the Primitives are a Scheduler Manager 102, a Task Manager 104, a Data Base Manager 106, a Timer Manager 108 and a Communication Manager 110. In turn, the Primitives communicate with the various microprocessors 98a, 98b through the macros 114, the assembly language 116 and the microcode 118 of the microprocessors 98a, 98b. The invoking of Instruction Modules and Primitives is illustrated in FIG. 3 by the solid lines connecting the Directives (98), Instruction Modules (100) and Primitives (102, 104, 106, 108, 110). It should be noted that each of the microprocessors 112 is suitably connected to suitable RAM and ROM memories as well as with other microprocessors.

Directives corresponding to macros in a physical machine (microprocessor) architecture are the top level of the operating control. The Directives shield the Operating System structure from changes in the compiler, allow for changes in the Operating System internal structure and abstract out from the compiler unnecessary Operating System details. Instruction Modules and Primitives make up the Operating System. Instruction Modules are the middle level and correspond to assembly language instructions in a physical machine. They are the smallest executable, nonpreemptive unit in the virtual machine. Preemption is similar to a physical machine interrupt capability except that a physical machine allows basically two concurrent processes or tasks (foreground or background) whereas the virtual machine allows an almost unlimited number of tasks executing in one or more physical processors.

The Primitives are the lowest level in the Operating System. They correspond to the microcode of a microprocessor. It is the function of the Primitives to implement the basic building blocks of the Operating System on a microprocessor and absorb any changes to the microprocessor. In general, Directives call upon one or more Instruction Modules which in turn invoke one or more of the Primitives to execute a task or process.

Preferably, the Instruction Modules 100 and the Primitives 102, 104, 106, 108 and 110 comprise software in silicon. However, it should be understood that it is within the scope of the present invention to implement the Instruction Modules and Primitives in hardware. They are building blocks in an overall control system.

In particular, the Instruction Modules and Primitives generally provide a set of real time, multitasking functions that can be used generically across different implementations of the microprocessors. In a machine or process control, the Instruction Modules and Primitives are extensions of the instruction set of the microprocessor. The microprocessor with its original set of Instruction Modules acts as a kernal, and the software and silicon or firmware acts as a shell.

Figure 4:
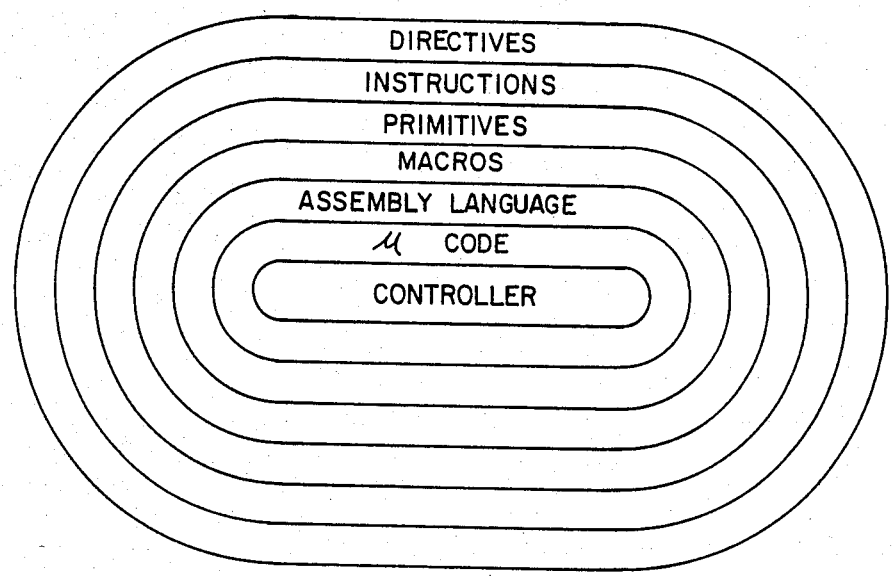
FIG. 4 is an illustration of the relationship of the first level and second level of controls of the controls shown in FIG. 1.

The machine control can be viewed as a nesting or overlay of successively higher levels of control as shown in FIG. 4. At the lowest level, is the microprocessor or controller responding to the microcode, assembly language and macros. Overlying this physical machine is the virtual machine comprising the Primitives and Instruction Modules responding to Directives. In effect, the Primitives break down the high level Directives and Instruction Modules into a level for the microprocessor to perform.

An instruction Module 100 in the operating system is known as a slice and one Instruction Module is given 500 microseconds to execute. The Instruction Modules are the smallest executable nonpreemptive units in the virtual machine. A listing and explanation of some of the more commonly used Instruction Modules 100 are given in Appendix A.

Preemption is similar to the microprocessor interrupt capability except that a microprocessor allows basically two concurrent processes (foreground and background). On the other hand, the virtual machine or Operating System allows an almost unlimited number of executions of concurrent processes or tasks in one or more of the microprocessors.

That is, the Operating System can begin executing several tasks in sequence by using the START instruction. Once each task is activated, it must wait its turn to have its next instruction executed. However, many tasks are active at the same time and being executed concurrently.

By a process or task is merely meant any block of code that is executed by a microprocessor. These blocks of code provide computations, housekeeping or direct control of the process or machine under control.

The Primitives are the lowest level in the Operating System. Primitives do not allow for implicit preemption and it is the function of the Primitives to implement the basic building blocks of the Operating System on a physical machine (microprocessor) and absorb any changes to the physical machine. Each of the Primitives is further broken down into sublevels known as primitive operations to carry out the operations of the particular manager. Appendix B lists various Primitive operations of the Scheduler Manager 102 and Appendix C lists various Primitive operations of the Task Manager 104.

The portion of the Operating System residing in the CPM board 70 is known as the Dynamic Operating System (DOS). As an example of memory allocation, in the CPM board 70, there is preferably 6K bytes of RAM for tables, 8K bytes of ROM for the Operating System, and 48K bytes of ROM for the application programs.

The Operating System sets up various RAM tables throughout the system. Portions of the RAM associated with each of the control boards are allocated space for various initializing and run time control information of the Operating System. Each of the Primitives is responsible for maintaining information in the RAM necessary to synchronize and coordinate the overall control of the machine or process. For example, the Scheduler Manager 102 sets up a table in RAM preferably on the CPM board 70 defining the sequence or schedule of the completing of tasks or processes. It determines the priority of execution of the various scheduled tasks. A task or process that has been suspended or is waiting is not scheduled. However, once the event occurs that the task is waiting for, the task is then scheduled for execution.

The Task Control Manager 104 is the Primitive that keeps track of the status of a particular process or task. It determines how the various operations are to be performed. For example, a particular task may require several Instruction Modules invoking many different Primitive operations. The Task Control Manager keeps a table in RAM on appropriate control boards of the status of each of the tasks. The Data Base Manager keeps track of the variables or constants or other information that are required to complete a task. This data is stored in a portion of RAM called a stack associated with each of the tasks.

Thus, for each task to be completed, the task itself must be scheduled by the Scheduler Manager 102, the status of the particular task is kept track of by the Task Control Manager 104 and any data required to complete the task is provided by the Data Base Manager 106. The Timer Manager 108 Primitive provides the necessary timing control for each task and the Communications Manager 110 Primitive provides the communications between the various control boards, preferably over a shared line.

As an example of how the Operating System operates, it is often required in the control of the printing machine to suspend or delay an operation for a set period of time. If a delay of 200 milliseconds is required, a Directive WAITR; 200 is used. This Directive invokes the Instruction Module $WAIT in turn invoking the Primitive operations:
 START TIMER
 SUSPEND TASK
 EXECUTE NEXT TASK which provide a 200 millisecond delay.

That is, an operation application code (control code in ROM) calls in a Directive. The Directive invokes one or more Instruction Modules 100. For example, if the application code calls in a WAIT DIRECTIVE, the WAIT Instruction Module will be invoked In turn, the WAIT Instruction Module will invoke the Timer Manager and Scheduler Manager which in turn provide the Primitive operation to complete the task. Once the WAIT Directive has been disseminated ot the proper Primitives for execution, the Instruction Module can accept another Directive.

Essential to the Operating System control is a set of processes or tasks that can be executed. The control of the printing machine is dependent upon the proper scheduling and timely execution of these tasks. The activation of lamps, clutches, motors and response to various sensors and conditions is accomplished through the completion of the predetermined tasks. A given number of tasks are active at any one time and the Operating System concurrently executes these active tasks. Many tasks are related to other tasks. The Operating System supports full process control by means of Instruction Modules that invoke a process or task and maintain a thread of control with that process or invoke a task and maintain no linkages. Therefore, various Instruction Modules or procedures are provided by the Operating System to maintain links between related tasks.

Thus, a START instruction or procedure spawns a completely independent task while a FORK procedure spawns a related task termed a Child. This Child becomes a member of the invoking task's family, also known as the Parent. Whenever a task is invoked by another task through a CALL procedure, the CALLing task is suspended (though still active) and the CALLed task becomes an active Child of the CALLing task. More detailed description of various Instruction Modules are provided in Appendix A.

All possible tasks are predefined and listed in a Static Task Control Block (STCB). The Static Task Control Block is a portion of Random Access Memory and Read Only Memory in all Operating System control boards. The random access portion of the Static Task Control Block in the Dynamic Operating System (on CPM board 70) is illustrated in FIG. 5a.

With reference to FIGS. 5a and 5b, there is shown portions of the Dynamic Operating System RAM map, i.e. the allocation of RAM locations on the CPM controller board 70. In general, each of the Managers or Primitives has associated RAM space which only that primitive is allowed to use. The first two blocks or column 0 and 1 are allocated to the Communication Manager 110, and the next two columns as well as portions of columns 5-8 D, E and F are allocated to the Data Base Manager (DBM) 106, in particular, byte and word stacks, event data and suitable pointers. The remainder of columns D, E and F are allocated to the Scheduler Manager 102, in particular, the priority section and forward and backward links to other tasks.

The Task Control Manager (TCM) 104 is allocated portions of columns 5 through C as well as column 4. Column 4 is a portion of the Static Task Control Block that identifies the TCB number or RTID of the currently active instance of a task or process. The remaining portions of the RAM space allocated to the Task Control Manager comprise locations known as the Task Control Blocks or Buffers (TCBs). The Task Control Blocks are the active tasks and include a Compile Time Identification (CTID), a next instance designation, a Parent Run Time Identification (RTID), a Join RTID, an activation address, a condition variable, and an interpreter address table. The remaining allocations are allocated to the Timer Manager 108, in particular, Real Time Clock (RTC) and Machine Clock (MC) data.

In the preferred embodiment, there are a total of 255 tasks available that are identified in the STCB. The Task Control Manager 104 also maintains the list of the currently active tasks (TCBs). Preferably, there are a maximum of 96 tasks that can be active at one time. This list is constantly changing as new tasks are started or activated and current tasks are suspended or deleted. There is a Task Control Buffer (TCB) associated with each instance of an active task.

For a particular task, the Static Task Control Block will point to a particular Task Control Buffer. The buffer will list the identification of the task and such information as the identification of a Parent or previous task that the current task is related to and any other information linking the current task to any other task.

Since the Operating System resides in more than one control board, each of the control board operating systems maintain the status information for a task in Task Control Blocks.

In operation, when a task is invoked, a TCB is allocated and all of the necessary process information is inserted. If a task is invoked by a processor with no thread of control, the Operating System looks where the task resides. If the task resides in the processor invoking the task (i.e. resides locally), the task is allocated a TCB and the task execution is started. If the task is external, that is in a processor different from the invoking processor, the Operating System sends the invocation request over the shared line or communications channel 80 to the appropriate Operating System of the processor maintaining the task. That Operating System allocates the task, a TCB, and starts the task.

If the task is invoked with thread of control and the task resides locally, then the task is allocated a TCB and part of the information in the new TCB and the Parent task TCB becomes the other Task Control Buffer's IDs. If the new task is external, then the task is allocated a TCB locally and the Parent and Child tasks are tagged with each others IDs and the Operating System sends the request to the appropriate Operating System in the network. The operating system then allocates a TCB for the Child task and a TCB for the Parent task and the appropriate tags are again made. This means that there is a pseudo TCB in each of the processors to represent the status of the Parent or Child task that resides in a different processor.

Certain task control Instruction Modules can modify that status. The current process control Instruction Module set is START for task invocation with its own, new, thread of control, FORK for task invocation with a thread of control, JOIN to allow a Parent task to synchronize with the Child, END to allow the Child task to join or synchronize to the Parent, and CANCEL to allow a Parent task to terminate the Child task. CANCEL is also used to terminate a STARTed task. All terminations cause the affected task to execute its WILL.

This system of using pseudo TCBs to represent a Parent or Child process in another processor gives the entire Operating System the capacity of making any task executable from any of the processors and thereby transparent to the applications software that generates the request.

As by way of example, allocation of TCBs and relationship with other TCBs reference is made to FIG. 6. The left column CPM (1) illustrates the CPM board 70 identified as number 1 and the right column RDH (2) illustrates the RDH board 82 identified as number 2. It is also assumed that there is a Task A, i.e. a block of code to be executed, residing in the CPM ROM, and a Task B residing in the RDH ROM. A Compile Time ID (CTID) of 35 has been arbitrarily given Task A and a Compile Time ID of 55 has been given Task B.

With reference to column 1, in the first row after CPM (1), there is shown Task A with a CTID of 35 and no board identification meaning that the task resides on the CPM board. In the next row with a CTID of 55 is Task B. Task B has an identification of 0002 meaning that the Task B resides in ROM on the RDH board.

Now assume that Task A has been invoked or called upon and is being executed. The code for Task A in RAM is illustrated by the block labeled A under Task A. At some point in Task A there will be a call to Task B residing in the RDH ROM.

With reference to column 1 under the RAM memory section, Task A is being executed because at some point in time Task A had been called upon in the control. At the time Task A was called upon, a Task Control Buffer was established in RAM memory on the CPM board, placing Task A in the system as an active task. The Task Control Buffer provides information concerning the specific task, in particular its relationship to other tasks. Since the RAM memory Task Control Buffers are allocated arbitrarily, Task A is shown as the second allocation in the RAM TCB on the CPM board. That is, it is given a Run Time Identification (RTID) of 2, the Compile Time ID number 35 is recorded. If Task A was related to another task, at this time a number would appear under the Parent ID (P-ID). At this point, it is also not known if the Task A will be joined to any other task therefore the Join ID (J-ID) number is blank. The Task A resides in the CPM module therefore no address is given under the address block.

Now assume the Task A has proceeded to the point of calling Task B. At this point, the identification ID 55 of Task B in the Static Task Control Block will be examined, and it will be determined that Task B resides on the RDH board. Task B will be allocated a buffer in the CPM RAM with a CTID of 55 as shown. It is arbitrarily given a RTID number 1 and identified in the Task Control Buffer with certain information. Since the Parent or calling task is Task A, the number 2 will be put in the P-ID column. Since there is no task to be joined known at this time, a 0 is put in the J-ID block and the address shows the address of the location of the task.

The control then vectors to the execution of Task B in ROM in the RDH board. At this time, the RAM memory in the RDH control board is allocated a Task Control Block arbitrarily shown as Run Time ID number 4, and CTID 55. The Parent of Task B is Task A indicated by the number 3. Also, a block in the RDH RAM is allocated for Task A, ID 35. Additional information for task 34 is included in this Task Control Block, in particular the Join ID number 4 and the address 0001. This information identifies the Task A as being related to Task B with the return to Task A after the completion of Task B.

It should be noted that the Task Control Block in the RDH RAM memory for Task A is in essence a pseudo allocation since a block has already been allocated for Task A in the CPM RAM memory. Similarly, the allocation of a block in CPM RAM for Task B is merely a pseudo representation since Task B has already been allocated a Task Control Block in the RDH RAM.

The Scheduler Manager 102 of the Operating System partitions segments of the microprocessors time among all active tasks. The Scheduler Manager is reponsible for determining which task is to receive the next chance to execute.

The Scheduler Manager 102 consists of a medium term scheduler and a short term scheduler. The medium scheduler determines which tasks are to receive execution time and determines the priority of execution. The short term scheduler is responsible for determining which task executes next.

The medium term scheduler handles the state transition of active tasks. The states of tasks are:

(1) Queued. Those tasks desiring an execution slice. Each Operating System's Instruction Module takes exactly one slice. A slice is the time the current task was given a chance to execute until it completes its first Operating System Instruction, approximately 500 microseconds. In order to achieve this, most of the Operating System Instructions execute the short term scheduler primitive upon completion of an Instruction. Other Instructions use the medium term scheduler primitive to change the attributes of tasks, (See Appendix B for more details on the Scheduler Manager Primitives)

(2) Suspended State. That is, the task is not to be considered for execution at the present time but will eventually want to execute, and (3) Dead state. That is, the task is not known to the scheduler and therefore cannot receive an execution slice.

Each task that is scheduled has an associated priority. This determines how often a task is given the chance to execute with respect to all other tasks. Queued and suspended tasks both have priorities. Suspended tasks are associated with a priority so that the medium term scheduler can be used to queue them at the priority they are suspended at. The short term scheduler is unaffected by the dead and suspended tasks.

The Scheduler decides which of the queued tasks to execute by viewing the data structures associated with each task, that is, a priority and two links. These are found in the CPM RAM as illustrated in FIG. 5b. The two links are arranged to form a doubly linked circular list of tasks. The Scheduler generally decides that the next task to execute is the task that the current tasks forward link points to.

The Scheduler also keeps track of an internal variable called $NEXT_ID. This variable is the Scheduler's best guess as to what the next task to execute after the task identified by $CURRENT_ID completes its slice.

The circular list data structure is referred to as the Scheduler's queue. Placement within the queue with respect to the system task known as $LEVEL TASK determines priority. This task is placed such that all the high priority tasks execute before it executes. Before passing control to the first low task, it changes the Scheduler's idea of whick task is to execute after the next one so that the Scheduler's normal routines will execute one low priority task and then return to $SYSTEM_TASK, which is positioned just before the first high priority task. This is done by performing the following operations.

$CURRENT_ID←next low task $NEXT_ID←$SYSTEM_TASK

Then, all of the high priority tasks execute once and we return to $LEVEL_TASK, which now allows the next low priority task to execute a slice before resuming execution at $SYSTEM_TASK. This causes all the high priority tasks to execute once for each execution of a slice of a low priority task. It insures that only one slice of execution by a low priority task will ever delay the response to executing any of the high priority tasks, no matter how many low priority tasks are queued.

In operation, the Scheduler maintains a list of high priority tasks to be executed and a list of low priorities to be executed. Upon execution of an Instruction pertaining to a particular task, approximately every 500 microseconds, the Scheduler Manager 102 will then point to the next high priority task to be executed. Each task generally comprises more than one Instruction. In this manner, a number of tasks are being performed concurrently. Even though no two tasks are being operated on simultaneously, because of the rapid cycling through the tasks, it appears there is simultaneous execution.

Figure 7:
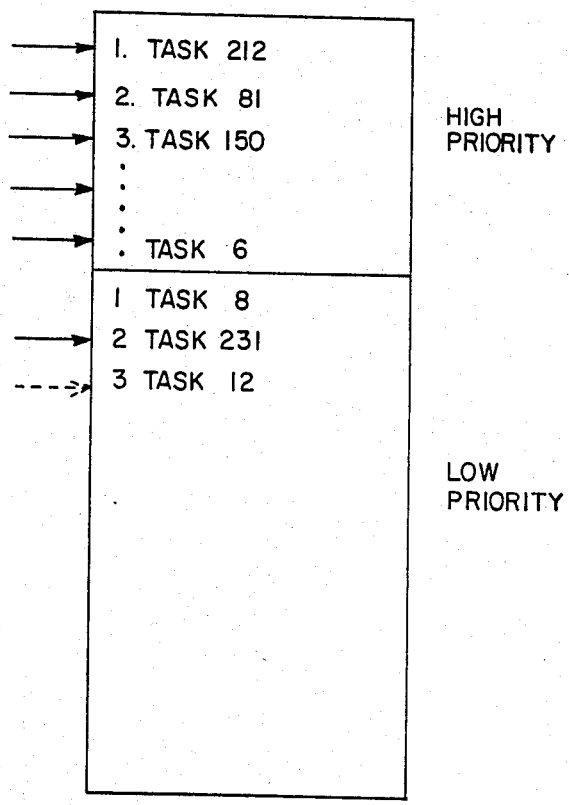
FIG. 7 illustrates one aspect of the Scheduler Manager control in accordance with the present invention.

For example, with reference to FIG. 7 there is illustrated the high priority section and the low priority section of the Scheduler RAM on the CPM board. In operation, the Scheduler Manager 102 will point to the execution of the next Instruction Module in Task 212, then Task 81, Task 150 and all the tasks in the high priority section ending with Task 6. Then the Scheduler Manager 102 will point to the next task in sequence in the low priority section, e.g. Task 231. After execution of an Instruction Module for Task 231, the control will return to the high priority section with Task 212 to the last task, Task 6. The control will then jump to the low priority section, but this time to Task 12, the next task after the previously Task 231.

Scheduling has been set up in this fashion for two very important reasons:

(1) No matter how many low priority tasks are active they cannot impact the response (time from wakeup or invocation to first slice being executed) or execution speed (number of slices executed per unit time) of high priority tasks.

(2) By only allowing each task to execute one slice at a time the response and execution speed under varying loads remains about the same. In addition, it gets the response faster than an execute to completion algorithm and the execution speed faster and more consistent than an algorithm where new tasks are immediately executed. In most systems, the first few instructions after a wakeup or invocation are the most critical or can be arranged to be so if necessary. This scheduling algorithm is tuned to give the best tradeoff between response and execution speed without adding prohibitive overhead.

Additional states and operations have been added to the Scheduler to allow a type of interrupt processing. They are described in this section. Spooling:

When processing an interrupt-type operation, it is often desirable to schedule a task for immediate execution. In our application, this occasion arises when processing interprocessor communications. In order to react quickly and efficiently without substantially hindering the performance of the rest of the system, the spool-threaded mechanism was used. This allows the user to put a task in a special form of suspension by threading it. A threaded task can be inserted into the short term scheduler quickly using the spool operation. A restriction is put on such a task; it will be given one execution slice and will then be considered to be dead until it is threaded and spooled again. This adds the states THREADED and SPOOLED to the set of possible states.

When the Scheduler spools a task, that task will be the next task to be executed after the current one finishes. This is accomplished by performing the following actions.

<spooled_task>'s forward link←$NEXT_ID $NEXT_ID←<spooled_task>

Note that only the forward link of the spooled task is altered, and that no other member of the scheduler's queue has been altered to point to the spooled task. Thus, the spooled task executes only once and will never receive another slice. VIP Activation:

When extremely fast interrupt-like operation is required, the VIP activate mechanism is used. This mechanism allows Very Important Processes to be CALLed by interrupt routines so that the interrupt routine can alias itself as a particular task and thus enjoy some of the capabilities formerly reserved only for tasks. These tasks execute until they become suspended or dead, and then return to the interrupt code that invoked them. In order to isolate this special mechanism from the rest of the system, VIP operations are kept separate from the rest of the system and are referred to as foreground scheduler operations.

The Data Base Manager 106 controls all the data bases for the various tasks. One type of data base consists of two list structures for passing correspondence and control. The other data base is used to implement the EVENT function of the Operating System.

The two list structures consist of a bytewide correspondence or byte stack and a wordwide control or word stack. Each list structure is a defined data area for maintaining a number of substructures associated with an active task. Each list structure consists of cells which can be thought of as information packets. A cell consists of two or three page adjacent bytes of memory with each cell divided into two fields, a link field and a data field. The first byte in the cell is the link field and contains an index, that is, an address of a cell within the list structure. If the list structure is the correspondence or byte stack, the next byte is the data field. If the list structure is the control or word stack, the next two bytes are dedicated to the data field.

The structure that couples an active task to a substructure is a pointer list. Two such lists are maintained by the Data Base Manager 106, one for each list structure. Each pointer list contains an entry for each possible active task in the system. The entry consists of a pointer to a substructure within the list structure. The Run Time Identification of a task is used to vector into the pointer list to retrieve the pointer to a task substructure. Initially the pointer list will be all zeros.

The stacks are maintained via a header pointer and the stack pointer list, pointing to the top of a stack associated with an active task. Within the stack, each cell has a link field and a data field. If the pointer to the stack is zero, there is no stack associated with this task.

When an entry is to be added to the stack, a free cell is found, the index of the previously added cell is put in the link field of the new cell, the data is moved to the data field and the index of the new cell is put in the stack pointer associated with the current task. This has the effect of adding the new cell to the top of the stack.

When an entry is to be removed from the stack, the data is removed from the cell on the top of the stack, the index and the link field of the cell is moved to the stack pointer (creating a new top of stack), and the cell is added to the list of available cells.

The function of the Communication Manager 110 is to provide for reliable and efficient control and manipulation of all communications between the microprocessors on the CPM, PHR, XER, MIR, DCR and RDHR boards 70, 72, 74, 76, 78 and 82, as shown in FIG. 2. It is responsible for all formatting preparation of information to be transmitted. It is also responsible for guaranteeing reliable and correct transmission of the information or notifying a higher level of control when this is not possible. It is the control link between the microprocessors.

The Timer Manager 108 provides a set of Primitive operations for the ordered suspension and wake up of all tasks requiring real time or machine clock delays. The timer procedures use a two-celled singly linked list to maintain information on all suspended tasks. One cell contains the tasks suspend duration while the adjoining cell contains the link to the task with a greater than or equal suspended time duration. The last task on this list points to the list header.

A task will normally request to be suspended for some duration and unless the SUSPEND is cancelled, its requested duration is run to completion.

A task could ask to be suspended for any of the following reasons:
 (i) It's waiting for input, e.g. register finger, front panel command, pitch reset, paper path switches, or sensors in sorts.
 (ii) A timed wait on either the Real Time Clock or the Machine Clock.
 (iii) It is in a RACE waiting on a case condition to be true, where the case conditions could be any of the reasons (i) or (ii).

In accordance with the present invention, there are four general cases or conditions for which a machine control can be suspended for the occurrence of a specific event. In particular, there is an input suspension case, (waiting for a transition of an input such as a switch), a time suspension case (waiting for the lapse of a certain period of machine or real time), a data suspension case (waiting for certain data to be presented or available), and finally a process or task suspension case waiting for the completion of a specific task or process.

With reference to FIG. 5A, various RAM locations on CPM board 70 are illustrated under the heading Event for maintaining the list of all suspended tasks waiting for some event or occurrence. These events may be input transitions such as a switch transition, or for completion of specified tasks with a specific Run Time Identification (RTID). In general, the RAM location includes the identification of the task waiting for the event and an identification of the event that the task is suspended on. In a preferred embodiment, there are only 64 entries at one time to the Event table.

There are also timer tables or RAM location for various time delays that have been set up, as shown in FIGS. 5a and 5b, under the headings R.T.C. and M.C. and also data and argument tables for maintaining a list of data and arguments that are needed for further handling of tasks and processes under the general heading DBM. In other words, there are lists maintained in RAM location of all the various tasks that the dependent upon a specific event, data time, or other task, and also identification of the specific event, data, time and task. These are known as suspended tasks that desire to be awakened or executed upon the occurrence of the desired event or at the desired state or condition of the control.

Once the desired state is reached, such as an input transition, a completed task, a completed time interval, or the availability of certain data, the list of suspended tasks related to the specific occurrence are scanned to determine the specific tasks waiting on that specific occurrence. That is, the list of suspended tasks is scanned to determine which ones should be awakened at that particular time. The control then vectors to the suspended task to continue execution at the point appropriate for the specific occurrence.

The Event table in RAM, for example, lists all the tasks waiting for an input. Assume that there are five tasks listed in the event table waiting for a particular switch signal. As soon as the switch signal occurs, the control will scan the Event table looking for tasks waiting on this switch. The control will then make these five tasks active. Thus, only one table, the Event table has been scanned. In response, five tasks have been activated without each task itself periodically scanning the switch to receive a wake up signal.

"Racing" is implemented by allowing a task to suspend on multiple conditions or occurrences simultaneously. Execution of the task will continue as soon as one of the conditions or occurrences is recognized. Continued execution of the task depends upon which of the conditions was met. For example, a particular switch input might result in a certain type of execution, wherein a timer runout might result in another type of execution. When any one of the occurrences or conditions, happens, all the other conditions for that task are removed from the various lists. By assigning a unique number to each condition, the control will check which number activated the task and automatically vector to the appropriate code for execution.

In the control code, RACING is provided by RACE/CASE statements. These statements are the means to test multiple conditions against time or against each other and to take appropriate action when any one of them becomes true. The following is an example of a RACE Instruction:

```
RACE ;
CASE      [ANYTIME]        condition;statement;
          [NEXTTIME]
END ;
```

This use is an example of where the condition is limited to a simple comparison of two values. The statement following a CASE condition is executed if the condition is the first to be met.

The difference between ANYTIME and NEXTTIME is that ANYTIME triggers execution of the CASE statements if the condition is true when the RACE Instruction is executed, while NEXTTIME specifically requests the next occurrence of the true condition. If neither is specified, ANYTIME is assumed.

A RACE Instruction can have as many CASE statements as necessary, each followed by a zero or an executable statement. It is important to insure that at least one CASE condition will always occur in order to avoid deadlocks. One way to insure occurrence is to always include a timer CASE as part of the RACE.

A sample RACE statement would be:

```
RACE ;
    CASE ELEVATOR = UP ;
        statement;
        statement;
    CASE 13 SEC;
        statement; /*TIMEOUT*/
        statement;
END ;
```

This Instruction would cause the execution of the second set of statements under CASE 13 SEC if the condition ELEVATOR-UP takes more than 13 second to become true.

As an example of checking for paper at a switch, the following Instruction would be used:

```
RACE
    CASE JAMTIME X MCLK
```

```
        DECLARE JAM
    CASE JAM SWITCH = PAPER
        statement
END
```

That is, if the jam switch fails to sense paper after X machine clocks, the statement "DECLARE JAM" is executed. Otherwise, the jam switch senses the paper in time, and the control will continue as directed by the statement.

While there has been illustrated and described what is at present considered to be a preferred embodiment of the present invention, it will be appreciated that numerous changes and modifications are likely to occur to those skilled in the art, and it is intended in the appended claims to cover all those changes and modifications which fall within the true spirit and scope of the present invention.

APPENDIX A

Instruction Modules

The following are some of the more commonly used Instructions Modules in the high level Instruction set:

$CALL
  CallType, Task
    The task identified by Task is activated. Parameters of the CALLer are transferred to the CALLee. The CALLee assumes the priority of the CALLer, and the CALLee becomes a member of the CALLer's family. The CALLer is restricted from executing further Directives until the CALLee completes its execution.
  Process CALL Explanation:
    The unique (Task Control Buffer) TCB will be allocated for the CALLee. If the CALLee is currently an active task, the CALL request is queued for execution when all pending instances are finished.
  Procedure CALL Explanation (a procedure is a task within a task)
    The CALLEE will utilize the CALLer's resources, for example TCB, while it is executing. This implies that since the CALLee does not have a TCB of its own there is no mechanism to queue instances of that task. Since no TCB is required for the CALLee, there is no need for a (Static Task Control Block) STCB.

$CANCEL
  CompileTimeID
    Routine identified by CompileTimeID will cease execution.
  Each freshly cancelled task will begin executing its WILL. All CHILDREN of the concelled task will be cancelled in the $WILL statement,. It is only possible to cancel a direct CHILD of your own or a STARTed task in the local processor.

CASE OF $DATA
  DataArguments, BranchAddress
    There are four types of data:
      (1) $BYTE: A string of bytes, considered as is
      (2) $BIT: A single bit, derived by ANDing the given byte with the given mask.
  DataArguments::=LeftStructure, Comparator, RightStructure
    Compares LeftStructure to RightStructure using Comparator. Branch is made if comparison is true. Note: Regarding structures, comparison is true if comparison is true of EVERY set of corresponding bytes in the structures.

$END
EndType
If the current task is ready to complete, it is made inactive. If its Parent (if it has a Parent) is suspended on the current task, it is allowed to continue execution.
Process END Explanation:
If a Parent task exists, both tasks must be ready to synchronize before the current task is made inactive. If the Parent is not ready, the current task will suspend and wait for its Parent. When both are ready, correspondence is exchanged, the Parent is allowed to continue its execution, and the Child is made inactive.
When a task is made inactive, the next pending request (if any) is made active and allowed to execute.
Procedure END Explanation:
The Parent task is allowed to continue execution.

$FORK
CompileTimeID
Explanation:
The task (FORKee), identified by CompileTimeID is activated. CorrespondenceParameters of the FORKer are transferred to the FORKee, and the FORKee is made part of the family. The FORKer's priorities are transferred to the FORKee. Both the FORKer and the FORKee continue executing (as opposed to the $CALL).
If the FORKee is currently an active task, the FORK request is queued for execution when the current activity completes. The task will execute in the order they are queued.

$JOIN
CompileTimeID
Explanation:
The current task is ready to synchronize with the task identified by CompileTimeID. If that task is also ready to synchronize, correspondence is exchanged, that task is made inactive (see $END) and the current task will continue its execution. If that task is not ready to synchronize, the current task will suspend on that task becoming ready to synchronize.

$PRIORITY
Value
Explanation:
Value is stored as the current task's priority and remains in effect until another $PRIORITY or until the task returns. Priority affects the given tasks utilization of the processor, in relation to other tasks.

$RACE
Conditions
Conditions::=Condition/Condition, Conditions
Condition::=CASE, BranchAddress
CASE::=$TIME, TimerType, Type, Time
/$TASK, CompileTimeID, ActiveStatus
/$DATA, DataArguments (See DATA write-up)
/$EVENT, Occurrence ($BIT, $DIRECT, Address, Mask), Sense
TimerType::=$REAL/$MACHINE
EmptyStatus::=$NOT_EMPTY
ActiveStatus::=$DIRECT/$IMMEDIATE
Occurrence::=+$ANY_TIME/$NEXT_TIME/-null*
Explanation:
All Conditions are evaluated and as soon as one becomes TRUE, execution continues with the Directive determined by (i.e. located at) BranchAddress.

$RESTORE_OS_CONTEXT
Explanation:
This Directive retrieves all necessary operating system context, previously stored by $SAVE_OS_CONTEXT, in order to resume executing Directives.

$SAVE_OS_CONTEXT
Explanation:
This Directive will save all necessary operating context in order to allow non-Directive execution.

$START
CompileTimeID
Failure: Number of active tasks is at the maximum.
Explanation:
The task (STARTee), identified by CompileTimeID, is activated. Priorities of STARTer are transferred to STARTee. The started task will initiate a new family. Both the STARTer and STARTee may continue executing Directives (as opposed to a $CALL). The STARTer's parameters are transferred to STARTee. Correspondence parameters are transferred from the STARTer to the STARTee.
If the STARTee is a currently active task, the START request is queued for execution when the current activity completes. The tasks will execute in the order they were queued.

$WAIT
Arguments
Argument::=$TIME, TimerType, Type, Time
/$TASK, CompileTimeID, ActiveStatus
/$DATA, DataArguments
TimerType::=$REAL/$MACHINE
EmptyStatus::=$NOT_EMPTY
ActiveStatus::=$ACTIVE/$NOT_ACTIVE
Type::=$DIRECT/$IMMEDIATE
Explanation:
The Condition is evaluated and no further Directives are executed until the Condition is TRUE at which point the next Directive is executed.

$WILL
Explanation:
Correspondence buffer is emptied. If current task has CHILDREN, all CHILDREN are cancelled. The $WILL statement must be the first executable statement of the task's will.

APPENDIX B

SCHEDULER MANAGER PRIMITIVES

Primitive: $P_MTS $START
Inputs:
$CURRENT_ID The task that is performing the operation
$FOUND_ID The tasks to start
Outputs: None
Explanation: The task identified by $FOUND_ID is moved from the DEAD state to the QUEUED state, assuming the priority of its Parent, which is identified by $CURRENT_ID.

Primitive: $P_MTS $ENTER
Inputs:
   $PRIORITY_VALUE The priority value for the newly scheduled task
   $CURRENT_ID The task that is performing the operation
   $FOUND_ID The task that is to be entered.
Outputs: None
Explanation: The task identified by $FOUND_ID is moved from the DEAD state to the SUSPENDED state and given the priority value in $PRIORITY VALUE.

Primitive: $P_MTS $DISCERN
Inputs: $CURRENT_ID
Outputs: $PRIORITY_VALUE
Explanation: Returns the current task's priority in $PRIORITY_VALUE. This is useful for starting a Child task with the Parent's priority, since $PRIORITY_VALUE can be used as an input variable for other Scheduler Primitives.

Primitive: $P_MTS $RELEASE
Inputs: $CURRENT_ID The task to be removed from the Scheduler
Outputs: $CURRENT_ID
Explanation: Moves the task identified by $CURRENT_ID from the QUEUED state to the DEAD state. It then schedules the next QUEUED task for execution, since the current one no longer exists.

Primitive: $P_MTS $FREE
Inputs: $FOUND_ID
Outputs: None
Explanation: Moves the task identified by $FOUND_ID from the SUSPENDED state to the QUEUED state, not altering its priority.

Primitive: $P_MTS $CAPTURE
Inputs: $CURRENT_ID The task to capture
Outputs: $CURRENT_ID
Explanation: Moves the task identified by $CURRENT_ID from the QUEUED state to the DEAD state. Since this leaves the current task DEAD, the next QUEUED task becomes the current task.

Primitive: $P_MTS $THREAD
Inputs: $CURRENT_ID The task to thread
Outputs: CURRENT_ID
Explanation: Moves the task identified by $CURRENT_ID from the SPOOLED or QUEUED state to the THREADED state, preparing it for the next SPOOL. It then schedules the next QUEUED task for execution, since the task that was current is not "suspended" (THREADED).

Primitive: $P_FGS $VIP_THREAD
Inputs: $CURRENT_ID The task to VIP thread
Outputs: $CURRENT_ID
Explanation: Moves the task identified by $CURRENT_ID from the SPOOLED or QUEUED states to the VIP THREADED state.

Primitive: $P_MTS $SPOOL
Inputs: $FOUND_ID
Outputs: None
Explanation: Causes the task identified by $FOUND_ID to be the task to be executed after the curent task has completed its slice. Note that if two SPOOLS are done in a row, they will cause LIFO execution of the SPOOLED tasks.

Primitive: $P_FGS $VIP_ACTIVATE
Inputs: $FOUND_ID The task to VIP activate
Outputs: $CURRENT_ID
Explanation: Causes the value in $CURRENT_ID to be stored and the value in $FOUND_ID to be used in $CURRENT_ID to determine the routine to "call". A call is made to the $$NEXT routine in the task control module, which vectors to the task's next activation address and allows it to execute NOW. When the task returns, using VIP suspend or VIP remove, execution continues at the 8085 Instruction just after the VIP activate Instruction, and $CURRENT_ID is restored.

Primitive: $P_FGS $VIP_SUSPEND
Inputs: $CURRENT_ID
Outputs: None
Explanation: "Returns" to the routine that performed the VIP activate that gave this "task" a chance to execute.

Primitive: $P_FGS $VIT_REMOVE
Inputs: $CURRENT_ID
Outputs: None
Explanation: "Returns" to the routine that performed the VIP activate that gave this "task" a chance to execute and moves the task identified by $CURRENT_ID from the VIP THREAD state to the DEAD state.

Primitive: $P_MTS $PRIORITY
Inputs:
   $PRIORITY_VALUE The new Priority
   $CURRENT_ID The task to change priority
Outputs: None
Explanation: Modifies the Scheduler's priority associated with the task identified by $CURRENT_ID to the value contained in $PRIORITY VALUE. Note: If the desired priority is the same as the current priority, this primitive performs a NO-OP.

Primitive: $P_MTS $INITIALIZE
Inputs: None
Outputs: None
Explanation: Sets up the Scheduler's internal data bases to include required system-related tasks. The system requires three operating system tasks: $SYSTEM_TASK (priority=X'40'), $LEVEL TASK (priority=X'20'), and BOTTOM task (priority=X'00'). Note that most of the above Primitives will not perform properly with less than two tasks in the QUEUED state, so these three tasks must not be altered with Scheduler Primitives once the system is running.

Primitive: $P_MTS $RESET
Inputs: $SYSTEM_ID Identifier of $SYSTEM_TASK
Outputs: $CURRENT_ID
Explanation: Resets the Scheduler so that execution slices are allocated starting with the SYSTEM task and continue with the rest of the QUEUED tasks.

Primitive: $P_STS $SCHEDULE
Inputs: $CURRENT_ID
Outputs: $CURRENT_ID
Explanation: Causes the Scheduler to indicate which task is to be given the next slice.

Primitive: $P_STS $INSERT
Inputs:
   $PRIORITY_VALUE Priority of task to insert
   $FOUND_ID Task to insert
Outputs: None
Explanation: Moves the task identified by $FOUND_ID from the DEAD state to the QUEUED state, using the priority specified in $PRIORITY_VALUE.

APPENDIX C

TASK MANAGER PRIMITIVES

$ALLOCATE, type

| type | :: = | $FOUND,$FORK |
|---|---|---|
| | | $FOUND,$START |
| | | $CURRENT,$EXTERNAL |

Explanation: Allocates a TCB (dynamic internal storage) for the specified task.

$ALLOCATE, $FOUND, $FORK

Explanation: Allocates a TCB for the found task with parental linkage to the current task.
- inputs: FOUND_CTID
  CURRENT_ID
- outputs: FOUND_ID

$ALLOCATE, $FOUND, $START

Explanation: Allocates a TCB for the found task with parental linkage to the current task.
- inputs: FOUND_CTID
  CURRENT_ID
- outputs: FOUND_ID

$ALLOCATE, $CURRENT, $EXTERNAL

Explanation: Allocates a TCB for the current task with external parental linkage.
- inputs: CURRENT_CTID
  PROCESSOR
- outputs: CURRENT_ID

$EXECUTE,function

| Function | :: = | $RELEASE, $CURRENT |
|---|---|---|
| | | $RELEASE, $FOUND |
| | | $VECTOR, $CURRENT |
| | | $NEXT, $CURRENT |
| | | $JOIN |

Explantion: Executes one of the prescribed functions on the specified TCB

$EXECTUE, $RELEASE, identifier

| indentifier | :: = | $CURRENT |
|---|---|---|
| | | $FOUND |

Explanation: Releases the identified (current or found) TCB's internal dynamic storage and maks the task inactive.
- inputs: CURRENT_ID
  FOUND_ID
- inputs: CC,Z,S = another instance in the queue
  FOUND_ID = next queued task.

$EXECUTE, $VECTOR, $CURRENT

Explanation: Causes the current task to schedule a new activation address.
- inputs: ACTIVATION_ADDRESS
  CURRENT_ID

$EXECUTE, $NEXT, $CURRENT

Explanation: Causes the current task to continue execution at its next scheduled address.
- inputs: CURRENT_ID

$EXECUTE, $JOIN

Explanation: Attempts to join the current task to the found task. If join attempt fails the current task is set up to accept a JOIN from the found task.
- inputs: CURRENT_ID
  FOUND_ID
- outputs: CC,Z,S = successful

$FIND,case

| case | :: = | $CHILDREN|$PARENT,$CHILDREN |
|---|---|---|

$FIND,$CHILDREN

Explanation: Finds the instance of the procedure identified by FOUND_CTID that is a child of the procedure identify by CURRENT_ID
- inputs: CURRENT_ID
  FOUND_CTID
- outputs: FOUND_ID
  PROCESOR
  CC,Z,S = task inactive or child not found.
  CC,C,S = child local

$FIND,$PARENT,$CHILDREN

Explanation: find the instances of the procedures indentified by CURRENT_CTID and FOUND_CTID that are a parent-child pair.
- inputs: FOUND_CTTID
  CURRENT_CTID
- outputs: FOUND_ID
  CURRENT_ID
  CC,Z,C = Parent-child pair found

$INITIALIZE

Explanation: Intializes the internal store of the TCM.

$SIGNAL,$FOUND,$SCANCELLED

Explanation: Signals the found task to begin execution from its WILL.
- inputs: FOUND_ID

$TEST,case

APPENDIX C-continued

TASK MANAGER PRIMITIVES

```
case      :: =           $CURRENT,| RUN | $COMPILE
          |              $FOUND, $RUN | $COMPILE
          |              $CHILDREN, $RUN | $COMPILE
          |              $PARENT, $RUN
          |              $TCB_AVAILABILITY
```

Explanation: Tests the specified TCB's (CURRENT, FOUND, CHILDREN, or PARENT) status using the specified identifier (RUN, COMPILE, or EXTERNAL) as an index.

$TEST,$CURRENT,$RUN

| inputs: | CURRENT_ID |
|---|---|
| outputs: | PROCESSOR |
| | CURRENT_CTID |
| | CC,Z,C = task active |
| | CC,C,C = task external |

$TEST, $CURRENT, $COMPILE

| inputs: | CURRENT_CTID |
|---|---|
| outputs: | PROCESSOR |
| | CURRENT_ID |
| | CC,Z,C = task active |
| | CC,C,C = task external |

$TEST, $FOUND, $RUN

| inputs: | FOUND_ID |
|---|---|
| outputs: | PROCESSOR |
| | FOUND_CTID |
| | CC,Z,C = task local |
| | CC,C,C = task external |

$TEST, $FOUND, $COMPILE

| inputs: | FOUND_CTID |
|---|---|
| outputs: | PROCESSOR |
| | FOUND_ID |
| | CC,Z,C = task active |
| | CC,C,C = task external |

$TEST, $CHILDREN, $RUN

| inputs: | CURRENT_ID |
|---|---|
| outputs: | PROCESSOR |
| | FOUND_ID |
| | CC,Z,C - child active |
| | CC,C,C = child external |

$TEST, $CHILDREN, $COMPILE

| inputs: | CURRENT_ID |
|---|---|
| | FOUND_CTID |
| outputs: | PROCESSOR |
| | FOUND_ID |
| | CC,Z,C = found taks active & child of current |
| | CC,C,C = found task external |

$TEST, $PARENT, $RUN

| inputs: | CURRENT_ID |
|---|---|
| outputs: | PROCESSOR |
| | FOUND_ID |
| | FOUND_CTID |
| | CC,Z,C = current task has an active parent |
| | CC,C,C = parent is external |

$TEST,$TCB AVAILABILITY

| inputs: | none |
|---|---|
| outputs: | CC,C,S = TCBs are available |

What is claimed is:

1. A machine control, said machine including a plurality of operating components cooperating with one another to produce a result, the control responding to control conditions and executing a plurality of tasks to synchronize the operating components, at least one of the tasks comprising a sequence of steps to be completed, at least one step of the sequence of steps depending upon the occurrence of at least one of a plurality of control conditions, each of the control conditions including an associated response related to the occurrence of said control condition, said control comprising means to set a list of control conditions related to said one step, means connected to the means to set a list to monitor said list of control conditions, means to execute the sequence of steps of said one of the tasks up to said at least one step, means to monitor the control conditions relating to said at least one step, means to determine the first occurrence of a control condition related to said at least one step, means responsive to the means to monitor to execute the response related to the first occurrence of said control conditions related to said at least one step, and means connected to the means to execute to ignore all other control conditions on said list related to said one step, whereby the operating components are synchronized to produce a result.

2. The control of claim 1 wherein one of said control conditions is a time period.

3. The control of claim 1 wherein one of said control conditions is a logic change.

4. The control of claim 1 wherein one of said control conditions is an executed task.

5. In a machine control for a machine having a plurality of operating components cooperating with one another to produce a result, the control responding to a plurality of control conditions to execute a plurality of tasks and synchronize the operating components, at least one of the tasks comprising a sequence of steps to be completed, at least one step of the sequence of steps depending upon the occurrence of at least one of a plurality of control conditions, each of the control conditions including an associated response related to the occurrence of said control condition, the method of control including the steps of providing a list of control conditions related to said one step, monitoring said list of control conditions, suspending operation of a portion of the control until the occurrence of one of the conditions of said list, recognizing the first occurrence of one of said control conditions, providing the associated response to the occurrence of said one of the control conditions, and ignoring the remainder of the conditions on said list in order to synchronize the operating components to produce a result.

6. The method of claim 5 including the step of continually scanning the list of control conditions to determine the first occurrence of one of said listed conditions.

7. The method of claim 6 including the step of providing the associated response to the occurrence of the first condition upon recognizing the second occurrence of said condition.

8. A machine control including a plurality of tasks for controlling the operation of a machine having a plurality of operating components, a portion of one of the tasks being executed by an operation upon the occurrence of a first or second condition to be able to complete said one of the tasks, the method of completing said one of the tasks comprising the steps of listing the first condition, providing the operation to be executed upon the occurrence of the first condition, listing the second condition, providing the operation to be executed upon the occurrence of the second condition, monitoring the first condition and the second condition, determining the first occurrence of either the first condition or the second condition, executing only the operation corresponding to said first occurrence condition whereby said one of the tasks is to be completed, and arresting the monitoring of the first and second condition.

9. In a machine control for controlling the operation of a machine having a plurality of operating components, said operating components cooperating with one another to produce a machine result, the control comprising a plurality of control elements for executing a plurality of tasks, the control of said operating components being responsive to the completion of said tasks, the control responding in a given manner to each of a plurality of control events, a method of the control elements executing a task including the steps of (1) selecting a task to be executed, a portion of the task depending upon a selected number of said plurality of control events, (2) identifying the control events, the first occurrence of one of said selected number of control events being essential to the execution of the task, (3) suspending execution of the task until said first occurrence of one of said selected number of control events, said control being conditioned to respond in said given manner depending upon said first occurrence, (4) recognizing said first occurrence of said selected number of control events, (5) responding to said first occurrence in said given manner, and (6) ignoring the remainder of said selected number of control events in order to complete the execution of the task.

* * * * *